United States Patent [19]

Jaeger

[11] Patent Number: 5,800,854
[45] Date of Patent: Sep. 1, 1998

[54] SYSTEM FOR MAKING PASTA

[76] Inventor: William Jaeger, 14701 Golf Rd., Orland Park, Ill. 60462

[21] Appl. No.: 739,304

[22] Filed: Oct. 29, 1996

[51] Int. Cl.$^6$ ............................................. A21C 3/04
[52] U.S. Cl. .................... 426/516; 426/451; 426/509; 426/557; 425/458; 425/461; 425/463; 241/95; 241/168; 99/353
[58] Field of Search ........................... 425/458, 463, 425/461; 426/509, 516, 451, 557; 241/95, 168; 99/353

[56] References Cited

U.S. PATENT DOCUMENTS

| | | | |
|---|---|---|---|
| 4,091,721 | 5/1978 | Cosmi | 99/453 |
| 4,322,202 | 3/1982 | Martinez | 425/208 |
| 4,360,332 | 11/1982 | Cyin | 425/191 |
| 4,383,813 | 5/1983 | Podell et al. | 425/204 |
| 4,420,298 | 12/1983 | Mandrick | 425/463 |
| 4,423,082 | 12/1983 | Bauernfeind et al. | 426/557 |
| 4,619,189 | 10/1986 | Kou | 99/334 |
| 4,816,281 | 3/1989 | Moriyama et al. | 426/144 |
| 4,954,359 | 9/1990 | Pratolongo | 426/557 |
| 5,007,819 | 4/1991 | Anderson | 425/184 |
| 5,273,770 | 12/1993 | Bertozzi et al. | 426/496 |

*Primary Examiner*—Laurie Scheiner
*Attorney, Agent, or Firm*—Gardner, Carton & Douglas

[57] ABSTRACT

A system for making pasta comprises in combination a dough bin having a bottom, extrusion holes associated with the bin bottom, and a hydrated pasta dough mixture in the bin which extrudes from the extrusion holes. Due to the percentage of fluid ingredients in the dough mixture, the pasta is extruded through the extrusion holes due to the force of gravity.

29 Claims, 1 Drawing Sheet

U.S. Patent     Sep. 1, 1998     5,800,854
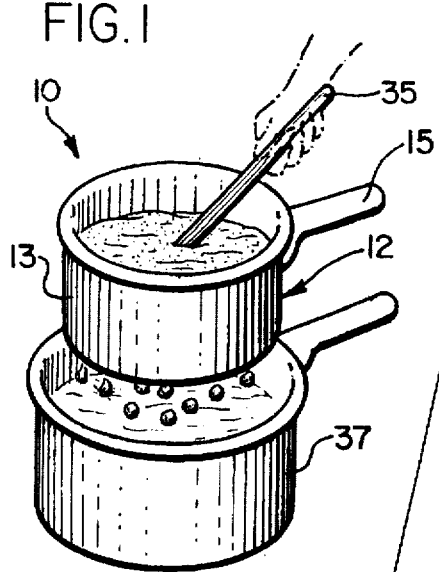
FIG.1
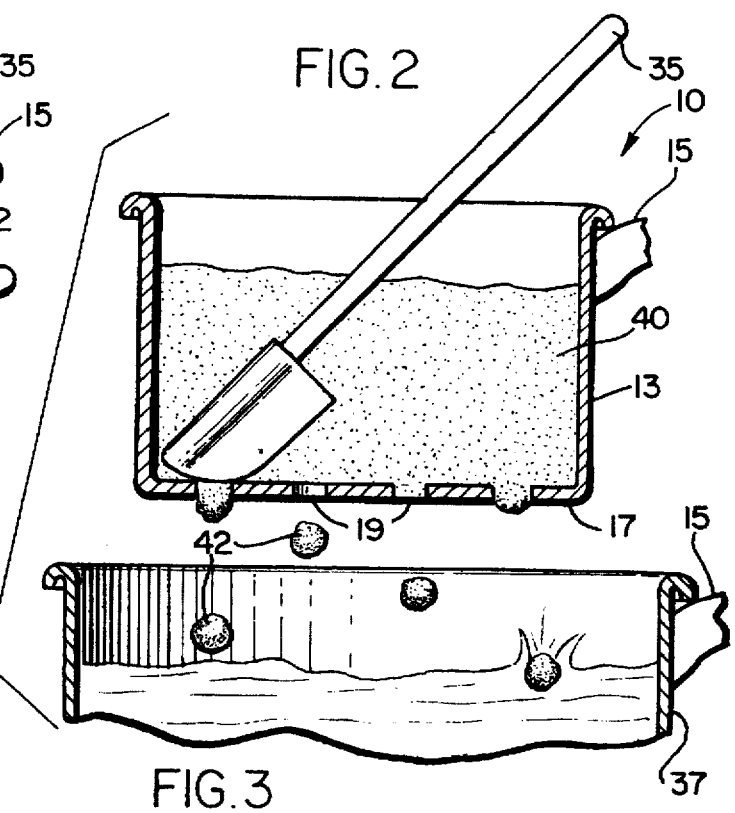
FIG.2
FIG.3
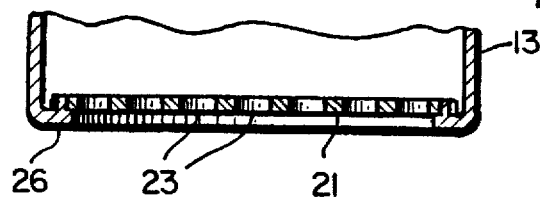
FIG.4
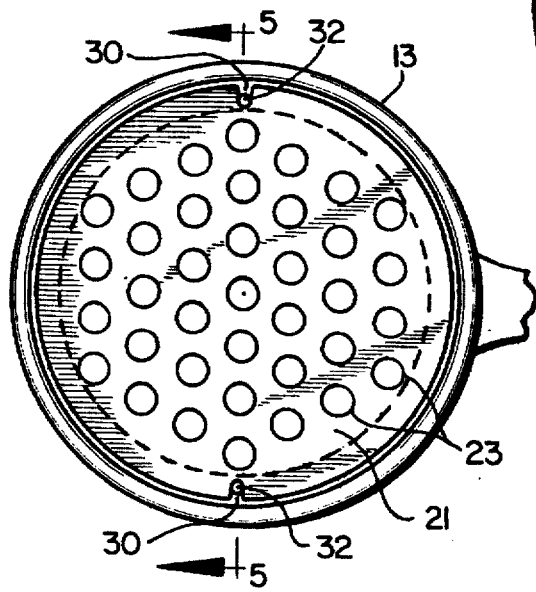
FIG.5
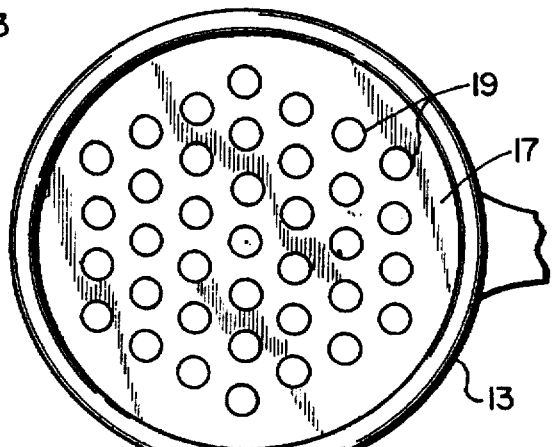
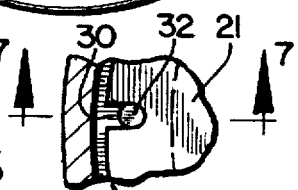
FIG.6
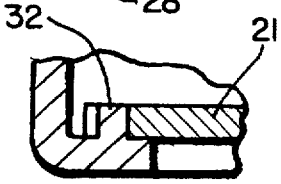
FIG.7

SYSTEM FOR MAKING PASTA

BACKGROUND OF THE INVENTION

This invention relates generally to pasta makers and more particularly to a pasta maker for use with hydrated pasta doughs.

Various shapes and sizes of pasta have been enjoyed all over the world for centuries. For much of that time, pasta was tediously made by hand. The process involved combining the necessary ingredients into a stiff, clay-like dough, kneading the dough, rolling it, and cutting it into the desired shapes and sizes. The pasta was allowed to dry and then was stored. When it was to be consumed, the pasta was brought out from storage and cooked, usually by boiling. This method of making pasta, however, involved much time and effort both in making the pasta and cleaning-up afterwards.

To facilitate pasta making, manual and automated pasta making devices were developed. A number of these devices combine the ingredients into dough, knead the dough, and form the pasta into the desired form by rolling and cutting. Alternately, in others of these devices, the dough is extruded under pressure through dies to form the pasta. The size and shape of the holes in the dies determine the size and shape of the pasta. These devices, however, tend to be costly, noisy, and time-consuming to use. In addition, the use of the devices requires considerable clean-up and maintenance and presents storage problems.

After pasta is formed using either the handmade method or one of the pasta making devices, the pasta is customarily dried and or heated. In order to prepare it for consumption from this state, the pasta is usually placed in boiling water. Such dried pasta requires between 8 to 10 minutes cooking time before it reaches its hydrated, consumable state. It requires such a large period of time because the pasta must be re-hydrated during the cooking process.

It is an object of the instant invention to provide a system for making pasta in which the pasta can be formed by gravity extrusion without kneading, rolling or cutting.

It is another object of the instant invention to provide a system for making pasta that does not require the pasta dough to be dried or heated during manufacture.

It is yet another object of the instant invention to provide a system for making pasta which makes hydrated pasta requiring only a few minutes of cooking.

It is a further object of this invention to provide a system for making pasta which does not require extensive production time or clean-up time and is not prone to mechanical difficulties.

These and other objects and advantages of the instant invention will be apparent from the following description and drawings.

SUMMARY OF THE INVENTION

The present invention overcomes the deficiencies of the prior art by providing a system for making pasta comprising in combination a dough bin having a bottom, extrusion means associated with the bin bottom, and a hydrated pasta dough mixture in the bin which extrudes from the extrusion means. Due to the percentage of fluid ingredients in the dough mixture, the pasta can be extruded through the extrusion means due to the force of gravity rather than pressure.

Since a hydrated pasta dough mixture is used which results in hydrated pasta nuggets, the system does not require the pasta dough to be kneaded, rolled, cut, dried or heated during manufacture, as prior art systems often require. The pasta nuggets are extruded directly into boiling water. Since the pasta nuggets are hydrated, they require only 3–4 minutes of cooking. Thus, the system can be used to make fresh pasta in a short amount of time.

Because of its design, the system does not require extensive clean-up time and it is not prone to mechanical difficulties. Further, it does not require a large amount of storage space.

BRIEF DESCRIPTION OF THE DRAWINGS

FIG. 1 is a perspective view of the instant invention in use;

FIG. 2 is a cross-sectional view of the instant invention in use;

FIG. 3 is a top view of a preferred embodiment of the instant invention;

FIG. 4 is a top view of an alternate preferred embodiment of the instant invention;

FIG. 5 is a cross-sectional view taken substantially in the plane of line 5—5 of FIG. 4;

FIG. 6 is a fragmentary detail view of the pin and notch arrangement of the alternate preferred embodiment of FIG. 4; and FIG. 7 is a cross-sectional view taken substantially in the plane of line 7—7 of FIG. 6.

DETAILED DESCRIPTION OF THE INVENTION

To provide a system for making pasta 10 in which the pasta can be gravity extruded in accordance with the invention, there is provided a hydrated pasta gravity extruder 12 comprising a dough bin 13 with a handle 15, as shown in FIGS. 1 and 2. The dough bin 13 resembles a typical 1½ quart cooking pot, with the exception of its bottom surface. The bottom surface 17 of the dough bin 13 is provided with extrusion means. In the preferred embodiment shown in FIG. 2, the extrusion means comprise a plurality of extrusion holes 19 defined in the bottom surface 17 of the dough bin 13. The extrusion holes 19 are arranged uniformly about the bottom surface 17 of the dough bin 13, the particular size of the holes depending upon the type, size and shape of pasta to be made.

An alternate preferred embodiment of the instant invention is depicted in FIG. 4, this embodiment differing from the embodiment of FIG. 2 in the extrusion means employed. The extrusion means of the alternate preferred embodiment comprises an extrusion die plate 21, the die plate 21 defining a plurality of extrusion holes 23. The extrusion holes 23 are located uniformly about the plate 21. The plate 21 is removable so as to be interchangeable with a number of other extrusion die plates, each having different sized holes. Die plates may be provided with holes having 5/16", ⅜", ½" or ¾" diameters. The distance between the holes of each plate is dependent upon the hole size. For example, a die plate which includes 5/16" holes has a distance of ¼" between each hole. In comparison, a die plate which includes ½" holes has a distance of ⅜" between each hole. For further comparison, a die plate which includes ¾" holes has a distance of ⅝" between each hole. The distance between the holes is important for proper pasta extrusion. If the holes are too close, the pasta, after being extruded, may re-coagulate. Of course, die plates having different sized holes are contemplated. The particular die plate with its corresponding sized extrusion holes is selected depending upon the type, size and shape of pasta to be made.

To support such die plates, the dough bin 13 is provided with a support lip or ring 26 located about its bottom circumference. The support lip 26 extends radially inwardly from the circumference of the bin 13. In order to ensure that the die plate 21 remains in place, a notch and pin arrangement is provided, as shown in FIG. 4. Each die plate 21 is provided with two notches 30 located at the outer edge of its circumference and placed diametrically opposed from one another. The support lip 26 of the dough bin 13 in turn is provided with pins or protrusions 32 along its inner surface, the pins 32 being placed diametrically opposed from one another. In a preferred embodiment, the pins 32 are located perpendicularly to a line representing an imaginary extension of the handle 15 across the dough bin 13. In use, the die plate 21 is placed on the support lip 26 in such a manner so that its notches 30 mate with the pins 32 of the support lip 26. With the notches and pins mating, the die plate 21 remains in place during the extrusion of the pasta.

To provide a system for making pasta in which the pasta can be gravity extruded, the pasta extruder 12 is used with a hydrated pasta dough 40 rather than with conventional, stiff clay-like pasta doughs. Such a hydrated pasta dough differs from conventional pasta doughs in the ratio of fluid ingredients to dry ingredients that are used to make the dough. Conventional pasta doughs typically are comprised of approximately 20 to 26% weight of fluid ingredients. Hydrated pasta doughs, in contrast, are comprised of approximately 39% to 72% weight of fluid ingredients. The hydrated pasta doughs require such a high percentage of fluid ingredients so that they are thin enough to be extruded from the pasta extruder 12 by the force of gravity. The type of pasta (for example, egg, flour or semolina) to be made determines the type of dough used and the size of the extrusion holes chosen.

In the baking world, the concept of baker's percentage is well known. This concept describes the percentage of each ingredient as compared to the percentage of flour in the mixture. The amount of flour is always described as 100%. Thus, a mixture that has 4 ounces of flour and 1 ounce oil is described as having 100% flour and 25% oil, for a total mixture of 125%. The baker's percentage is based on the weight of the ingredients.

The instant invention can be used with a number of different hydrated pasta dough mixtures, one being a hydrated semolina pasta dough mixture. This mixture requires ½ cup semolina, 1 cup all purpose flour, 1 teaspoon salt, 1 egg, and 5 ounces water in order to make 3 to 4 portions. In approximate baker's percentage terms, such a mixture requires 66.66 % semolina, 100.00% flour, 4.44% salt, 44.44% egg, and 111.11 % water. Thus, the hydrated semolina pasta dough mixture has a fluid ingredient content in the range of 42 to 46% by weight of the total mixture, preferably 44%. When using this pasta mixture, a die plate having 5/16" or 3/8" holes is preferred.

Another pasta dough mixture that can be used with the instant invention is a hydrated egg pasta dough mixture. This mixture requires 1 cup all purpose flour, 3 eggs, and 1 teaspoon salt in order to make 3 to 4 portions. In approximate baker's percentage terms, such a mixture requires 100.00% flour, 133.33% egg, and 4.44% salt. Thus, the hydrated egg pasta dough mixture has a fluid ingredient content in the range of approximately 39 to 43% by weight of the total mixture, preferably 41%. When making egg pasta, a die plate having 5/16" or 3/8" holes is preferred.

Yet another pasta dough mixture that can be used with the instant invention is a hydrated flour pasta dough mixture. This mixture requires 2 cups all purpose flour, 1 teaspoon salt, and 10 ounces water in order to make 3 to 4 portions. In approximate baker's percentage terms, such a mixture requires 100.00% flour, 2.22% salt, and 111.11% water. Thus, the hydrated flour pasta dough mixture has a fluid ingredient content in the range of approximately 49 to 55% by weight of the total mixture, preferably 52%. When making flour pasta, a die plate having 5/16", 3/8" or ½" holes is may be used.

Another pasta dough mixture that can be used with the instant invention is a hydrated gnocchi mixture. This mixture requires ½ cup water, 2 ounces butter, 1 teaspoon salt, ⅔ cup all purpose flour, and 3 eggs in order to make 3 to 4 portions. In approximate baker's percentage terms, such a mixture requires 133.00% water, 66.66% butter, 6.66% salt, 100.00% flour, and 146% egg. Thus, the hydrated gnocchi pasta dough mixture has a fluid ingredient content in the range of approximately 65 to 72% by weight of the total mixture, preferably 68%. When making gnocchi, any of the four die plates may be used.

The use of the instant invention is depicted in FIGS. 1 and 2. It should be understood that either of the preferred embodiments are used in the manner described below. To make pasta using the instant invention, the cook places a pot 37 of water on the stove to boil, much as one would do to make any pasta. Then the cook prepares one of the hydrated pasta dough mixtures. Depending upon what type of pasta is being prepared and the desired size and shape of the pasta, an extruder with appropriately sized holes is selected. If the embodiment of FIG. 4 is being used, the appropriate extrusion die plate 21 is placed into an pasta extruder 12. The cook then places the pasta extruder on a flat surface such as a dinner plate. The reason for this placement is to inhibit the hydrated pasta dough 40 from extruding prematurely from the dough bin and also to enable the cook to easily transport the extruder to a location above the pot of water. When the water has reached a boil, the extruder is moved into position above the pot of water, the flat surface is removed from beneath the dough bin, and the pasta dough is allowed to extrude by gravity through the extrusion holes, into the boiling water. As the dough is extruding, the cook "cuts off" the pasta by scraping a rubber spatula 35 over the interior surface of the die plate 21 until all the dough has been extruded. The pasta takes the shape of pasta nuggets 42, as can be seen in FIG. 2.

Since the pasta is in a hydrated state, rather than a dry state, before it is placed in the boiling water, it requires only 3–4 minutes to cook. Thus, the cook saves time making the pasta since it is not necessary to knead, roll, cut, dry or heat the pasta dough during its production. Further, the pasta made by the system of the instant invention is fresher than the dried pastas and thus results in a better taste.

Additionally, since the extruder involves either one part, the dough bin, or two parts, the dough bin and a die plate, less time is required to prepare the pasta and to clean-up afterwards and less space is needed for storage. The system is not complicated or difficult to operate. As there are no moving parts, there is no fear of mechanical problems.

It should be understood that various changes and modifications to the preferred embodiments described herein will be apparent to those skilled in the art. Such changes and modifications can be made without departing from the spirit and scope of the instant invention and without diminishing its attendant advantages. It is therefore intended that such changes and modifications be covered by the appended claims.

I claim:

1. A system for making pasta, comprising in combination:

a dough bin having a bottom;

a gravity extrusion means associated with the bin bottom;

and a hydrated substantially fluid pasta dough mixture which extrudes from the extrusion means due to the force of gravity.

2. The system of claim 1 wherein the gravity extrusion means comprises a plurality of extrusion holes of a constant cross-section and diameter, the extrusion holes extending through the bottom of the dough bin.

3. The system of claim 2 wherein the gravity extrusion means comprises an extrusion die plate defining the plurality of extrusion holes the extrusion holes having a constant cross-section and extending through the extrusion die plate.

4. The system of claim 3 wherein the bottom of the bin is provided with a lip for supporting the extrusion die plate.

5. The system of claim 4 wherein the lip is provided with at least one protrusion and the extrusion die plate is provided with at least one notch, the protrusion and the notch cooperating together to ensure that the extrusion die plate remains in place during the extrusion of pasta.

6. The system of claim 3 wherein the extrusion die plate is interchangeable with other extrusion die plates having different sized holes.

7. The system of claim 1 further including a spatula for assisting in the separation of the hydrated pasta dough mixture from the extrusion means.

8. The system of claim 1 wherein the hydrated pasta dough mixture contains semolina, flour, salt, egg, and water.

9. The system of claim 1 wherein the hydrated pasta dough mixture comprises flour, egg, and salt.

10. The system of claim 1 wherein the hydrated pasta dough mixture comprises flour, salt, and water.

11. The system of claim 1 wherein the hydrated pasta dough mixture comprises water, butter, salt, flour, and egg.

12. The system of claim 2 wherein the hydrated pasta dough mixture comprises a fluid ingredient content in the range of approximately 42 to 46% by weight of the total dough mixture and requires an extrusion hole size in the range of approximately 5/16" to 3/8".

13. The system of claim 2 wherein the hydrated pasta dough mixture comprises a fluid ingredient content in the range of approximately 39 to 43% by weight of the total dough mixture and requires an extrusion hole size in the range of approximately 5/16" to 3/8".

14. The system of claim 2 wherein the hydrated pasta dough mixture comprises a fluid ingredient content in the range of approximately 49 to 55% by weight of the total dough mixture and requires an extrusion hole size in the range of approximately 5/16" to 1/2".

15. The system of claim 2 wherein the hydrated pasta dough mixture comprises a fluid ingredient content in the range of approximately 65 to 72% by weight of the total dough mixture and requires an extrusion hole size in the range of approximately 5/16" to 3/4".

16. The system of claim 2 wherein the hydrated pasta dough mixture comprises a fluid ingredient content in the range of approximately 42 percent to 72 percent.

17. The system of claim 2 wherein the extrusion hole sizes are in the range of approximately 1/2 inch to 3/4 inch.

18. A system for making pasta, comprising in combination:

a dough bin having a bottom;

extrusion means associated with the bin bottom;

and a pasta dough mixture in the bin which extrudes from the extrusion means due to the force of gravity, the pasta dough mixture having a fluid ingredient content of at least 39% by weight of the total dough mixture.

19. The system of claim 18 wherein the extrusion means comprises a plurality of extrusion holes of a specific size.

20. The system of claim 19 wherein the extrusion means comprises an extrusion die plate defining the plurality of extrusion holes.

21. The system of claim 20 wherein the extrusion die plate is interchangeable with other extrusion die plates having different sized holes.

22. The system of claim 20 wherein the bottom of the bin is provided with a lip for supporting the extrusion die plate.

23. The system of claim 22 wherein the lip is provided with at least one protrusion and the extrusion die plate is provided with at least one notch, the protrusion and the notch cooperating together to ensure that the extrusion die plate remains in place during the extrusion of the pasta.

24. The system of claim 18 further including a spatula for assisting in the separation of the hydrated pasta dough mixture from the extrusion means.

25. A method of making pasta comprising the steps of:

a) providing a dough bin with a bottom, the bottom defining extrusion means;

b) placing a quantity of hydrated pasta dough mixture into the bin; and c) extruding the pasta dough mixture through the extrusion means by the force of gravity.

26. The method of claim 25 further comprising the step of extruding the pasta into boiling water.

27. The method of claim 25 further comprising the step of assisting in the separation of the hydrated pasta dough from the extrusion means by scraping an inside surface of the extrusion means with a spatula.

28. The method of claim 25 further comprising the step of placing a flat surface beneath the bin before the step of placing the pasta dough mixture into the bin.

29. The method of claim 28 further comprising the step of removing the flat surface from beneath the bin before the step of extruding.

* * * * *